United States Patent [19]
Marcuse et al.

[11] Patent Number: 5,841,913
[45] Date of Patent: Nov. 24, 1998

[54] ACOUSTO-OPTIC PLANAR WAVEGUIDE MODULATORS

[75] Inventors: Dietrich Marcuse, Lincroft; Herman Melvin Presby, Highland Park, both of N.J.

[73] Assignee: Lucent Technologies Inc., Murray Hill, N.J.

[21] Appl. No.: 861,287

[22] Filed: May 21, 1997

[51] Int. Cl.$^6$ .................................................... G02B 6/10
[52] U.S. Cl. .................................. 385/7; 385/43; 385/28; 385/8; 385/2
[58] Field of Search ................................. 385/7, 8, 9, 10, 385/28, 30, 129, 130, 131, 43, 2, 3

[56] References Cited

U.S. PATENT DOCUMENTS

| | | | |
|---|---|---|---|
| 4,991,923 | 2/1991 | Kino et al. | 350/96 |
| 5,164,628 | 11/1992 | Egara et al. | 385/7 |
| 5,367,216 | 11/1994 | Egara et al. | 385/7 |
| 5,689,362 | 11/1997 | Kadota | 385/7 |

OTHER PUBLICATIONS

C.H. Henry et al., "Glass Waveguides on Silicon for Hybrid Optical Packaging", 7 *J. Lightwave Technol.*, pp. 1530–1539 (1989).
D.P. Morgan, Surface–Wave Devices for Signal Processing, ch. 1, pp. 1–14, (Elsevier Science Pub. Co., N.Y., 1985).
D. Marcuse, Light Transmission Optics, ch. 8, p. 327 (Van Nostrand Reinhold Co., N.Y., 1992).
D. Marcuse, Light Transmission Optics, ch. 10, pp. 407–431 (Van Nostrand Reinhold Co., N.Y., 1992).

*Primary Examiner*—Hung N. Ngo
*Attorney, Agent, or Firm*—Robert E. Rudnick

[57] ABSTRACT

An exemplary embodiment of an acousto-optic planar waveguide modulator includes a planar waveguide structure with an input section connected to a multimode section connected to an output section. The input and output sections have structures for propagating an optical signal in a first transmission mode. The multimode section has a structure in which an optical signal can propagate in the first transmission mode and a second transmission mode. A surface acoustic wave source is used to direct a surface acoustic wave at the multimode waveguide section to cause a periodic change in the refractive index for coupling optical signal energy between the even and odd transmission modes. As a consequence, power of an optical signal propagating in the even transmission mode is transferred to the odd transmission mode. This power transfer causes an attenuation of the optical signal propagating in the even transmission mode from the multimode section to the output section. Such attenuation can be varied in accordance with a second signal to modulate the optical signal by correspondingly varying the surface acoustic wave energy to produce a modulated optical signal. Further embodiments modulate optical signals propagating in single mode waveguides having their transmission modes evanescent field coupled to respective transmission modes of the planar multimode waveguides.

39 Claims, 3 Drawing Sheets

ACOUSTO-OPTIC PLANAR WAVEGUIDE MODULATORS

FIELD OF THE INVENTION

The invention relates to optical signal modulators.

BACKGROUND OF THE INVENTION

Optical transmission and processing systems are being implemented for use in various communication applications. For example, telephone and data transmission systems are now in use that utilize optical fibers to transmit voice and data signals over long distances. In such systems, data and/or digitized voice signals are modulated with an optical carrier signal for transmission. Modulation is the variation of a characteristic of a signal wave in accordance with a characteristic of another signal wave.

U.S. Pat. No. 4,991,923, entitled "Acousto-Optic Modulator For Optical Fibers Using Hertzian Contact with a Grooved Transducer Substrate" to Kino et al. (Kino et al. patent), which is incorporated by reference herein, describes a non-invasive component that is attachable to an optical fiber for modulating a light signal propagating therein. A modulator arrangement includes an acoustic transducer formed on a top surface of a glass substrate. A bottom surface of the substrate has a precision-formed groove with an exact radius. This groove radius is precisely formed to provide a Hertzian contact between an optical fiber and the substrate groove, when the fiber is pressed into the groove. A Hertzian contact enables propagation of acoustic waves over an acoustic path formed entirely of solid material from the substrate through the Hertzian contact interface and into the waveguide.

In operation, acoustic waves generated by the transducer propagate into the substrate, through the formed Hertzian contact, and into the optical fiber. These acoustic waves then interact and modulate an optical signal propagating in a transmission mode within a core of the optical fiber by coupling signal power from this core transmission mode to a transmission mode of the lossy cladding layer surrounding the core of the optical fiber.

Nevertheless, a need exists for an even more compact modulator that facilitates integration with other optical components. Optical planar waveguide structures, such as silica optical circuits, are substantially more compact than fiber-based modulators and are manufacturable at relatively low cost. The basic structure of such devices is described in C. H. Henry et al., "Glass Waveguides on Silicon for Hybrid Optical Packaging", 7 J. Lightwave Technol., pp. 1530–1539 (1989). Typical silica optical circuits have core waveguide structures of doped silica glass disposed within silica glass formed on a substrate and enable multiple optical components to be formed on a common substrate.

However, conventional planar waveguides lack the existence of discrete cladding transmission modes that are typically relied upon to produce fiber-based modulators. Thus, the acousto-optic configuration employed in fiber-based modulators is inapplicable to planar waveguide structures. Accordingly, a need exists for a planar waveguide modulator configuration.

SUMMARY OF THE INVENTION

The invention is directed to an optical planar waveguide modulator circuit employing an acousto-optic effect to modulate a light signal propagating through the waveguide. In accordance with a first embodiment of the invention, the modulator employs a waveguide structure having an input section connected to a multimode section connected to an output section. The input and output sections have structures for propagating an optical signal in a common first, even transmission mode. The multimode section has a structure in which an optical signal can propagate in the first transmission mode as well as a second, next higher order, odd transmission mode that is not supported by the input and output sections. The waveguide structure enables propagation of an optical signal from the input section through the multimode section to the output section substantially in the even transmission mode.

A surface acoustic wave (SAW) source is employed to produce a surface acoustic wave or Rayleigh wave capable of providing sufficient acoustic wave energy to the buried multimode waveguide section to cause a sufficient periodic change in the refractive index to couple light energy between the even and odd transmission modes. As a consequence, a portion of power of an optical signal propagating in an even transmission mode is transferred to the odd transmission mode due to the periodic refractive index change caused by the surface acoustic wave. This power transfer causes an attenuation of the corresponding signal propagating in the even transmission mode. Since the odd transmission mode is not supported by the output section, the signal propagating from the multimode section to the output section is substantially in the even transmission mode which is the attenuated optical signal.

The extent of power transfer, and correspondingly the extent of attenuation of the optical signal propagating through the multimode section in the even transmission mode, is based on the intensity of the generated surface acoustic wave. Thus, it is possible to modulate an optical signal with a second signal by varying the surface acoustic wave power propagating through the multimode section based on the varying magnitude of the second signal. Further embodiments employ such coupling of the transmission modes of a multimode waveguide for modulating an optical signal propagating in a single mode waveguide having a transmission mode evanescent field coupled to the even transmission mode of the multimode waveguide.

Additional features and advantages of the invention will become more readily apparent from the following detailed description and accompanying drawings.

DETAILED DESCRIPTION

Figure 1:
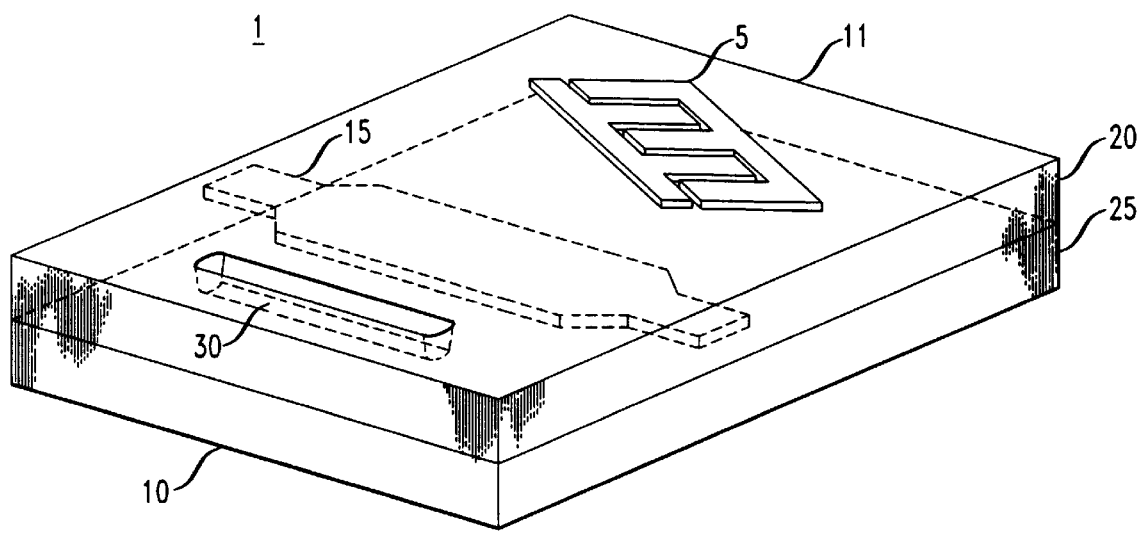
FIG. 1 illustrates a perspective view of an exemplary silica optical circuit modulator in accordance with a first embodiment of the invention.

The invention relies on surface acoustic waves for providing sufficient acoustic wave energy to a multimode planar waveguide for causing a desirable periodic change in its refractive index to couple power of an optical signal propagating in a first, even transmission mode of the waveguide to a second, next higher order, odd transmission mode of the waveguide. Such coupling is advantageously used in the invention to attenuate an optical signal propagating in the even transmission mode by transferring power to the odd transmission mode by directing a surface acoustic wave at the multimode waveguide. The extent of the attenuation is dependent on the magnitude of the power of the surface acoustic wave interacting with the waveguide. Accordingly, it is possible to modulate an optical signal with a second signal by varying the surface acoustic wave power in accordance with the varying magnitude of the second signal.

In a first exemplary embodiment of the invention, such a multimode waveguide is connected between single mode input and output planar waveguide sections to enable propagation of an optical signal from the input section through the multimode section to the output section substantially in the first, even transmission mode. A surface acoustic wave propagating through the multimode section causes a sufficient periodic change in the refractive index to couple light energy between the first and second transmission modes. As a consequence, a portion of power of an optical signal propagating in the even transmission mode is transferred to the next higher order, odd transmission mode due to the induced periodic refractive index change. This power transfer causes an attenuation of the corresponding signal propagating in the even transmission mode.

Since the odd transmission mode is not supported by the output section, the signal propagating from the multimode region to the output single mode section is substantially the attenuated optical signal propagating in the even transmission mode. Moreover, since the extent of the attenuation of the optical signal propagating in the even transmission mode is based on the power of the surface acoustic wave, it is possible to modulate an optical signal with a second signal by varying the surface acoustic wave power based on this second signal.

A surface acoustic wave, also referred to as a Rayleigh wave, is a particular type of acoustic wave that is guided along a plane surface of a material with its amplitude decaying exponentially with depth into the material. An acoustic wave is an elastic non-electromagnetic wave having a frequency typically in the range from below one hertz up to tens of gigahertz. An acoustic wave can be propagated in a medium having inertia and elasticity (the existence of forces which tend to restore any part of a medium to its original position), and in which displaced particles transfer momentum to adjoining particles and are themselves restored to their original position. However, in a surface acoustic wave, approximately 90% of the wave's energy propagates within a depth from the plane surface corresponding to one wavelength of the acoustic wave. Surface acoustic waves are described in greater detail in D. P. Morgan, *Surface-Wave Devices for Signal Processing*, (Elsevier Science Pub. Co., N.Y., 1985)(*Surface-Wave Device* reference), which is incorporated by reference herein.

Since silica optical circuit structures include optical waveguides formed relatively near a plane surface of the structures and since 90% of the energy of a surface acoustic wave propagates within one acoustical wavelength of the plane surface, it is possible to select a surface acoustic wave wavelength that enables the use of a multimode waveguide section of advantageously short length for providing the optical signal modulation of the invention. Numerous silica optical modulator configurations are useable for performing optical signal modulation according to the invention. For instance, in addition to modulating optical signals propagating through input or output single mode waveguide sections connected to a multimode section in accordance with the invention, it is also possible to modulate optical signals propagating in single mode waveguides that are coupled to such a multimode section, such as by evanescent field coupling in accordance with the invention.

FIG. 1 depicts an exemplary modulator 1 in accordance with s first embodiment of the invention. In FIG. 1, the modulator 1 includes a surface acoustic wave (SAW) source 5 positioned on a surface 11 of a silica optical structure 10 containing an exemplary planar modulator waveguide structure 15. The planar waveguide 15 is located within silica glass 20 formed on a substrate 25 of the silica optical structure 10. The SAW source 5 is positioned relative to the waveguide structure such that generated surface acoustic waves interact with the waveguide structure 15 at a particular phase matching angle relative to a multimode section of the waveguide structure 15 producing the desired coupling of transmission modes of the multimode section as described in greater detail below with regard to FIG. 2. Also, an optional acoustic wave damper 30, such as a trench 35 containing an acoustic energy absorbing material 40, is shown within the structure to reduce acoustic wave reflections that would be directed at the waveguide 15 at other than the desired phase matching angle.

An exemplary fabrication process for the silica optical structure 10 is as follows: a base layer of silica glass is deposited on the substrate 25, such as a silicon substrate using, for example, low pressure vapor chemical deposition or flame hydrolysis; and then a thin core layer of doped silica glass is deposited on this silica glass layer; the core layer is then configured to the desired structure of the waveguide 15 using standard photo-lithographic techniques, such as lithography, etching; and a layer of doped silica glass is then optionally deposited over the core layer to act as a top cladding. A suitable doping profile for the doped silica glass is uniform step-index distribution. While the proceeding description relates to silica on silicon waveguide devices, it should be understood that it is possible to fabricate the circuit on other substrate materials including fused quartz, ceramic or III–V materials, such as InP or GaAs.

The silica glass top cladding and the base layer of silica glass form the silica glass 20. Suitable thicknesses for the base silica layer, core layer and top cladding layer are 10 to 20 $\mu$m, 4 to 8 $\mu$m and 0 to 20 $\mu$m, respectively. Thicknesses less than 10 $\mu$m for the base silica layer are undesirable because of light loss to the substrate while thickness greater than 20 $\mu$m are generally disadvantageous because of long deposition times required to form such thicknesses. For a detailed discussion of glass waveguides on silicon and the fabrication thereof, see, for example, C. H. Henry et al., "Glass Waveguides on Silicon for Hybrid Optical Packaging", 7 *J Lightwave Technol.*, pp. 1530–1539 (1989), which is incorporated by reference herein.

The particular type of device or arrangement used for the SAW source 5 in producing surface acoustic waves in the silica optical structure 10 is not critical to practicing the invention. Exemplary devices for the SAW source 5 include conventional interdigital transducers and other ZnO transducer configurations which are described in, for example, the previously cited *Surface-Wave Device* reference.

Figure 2:
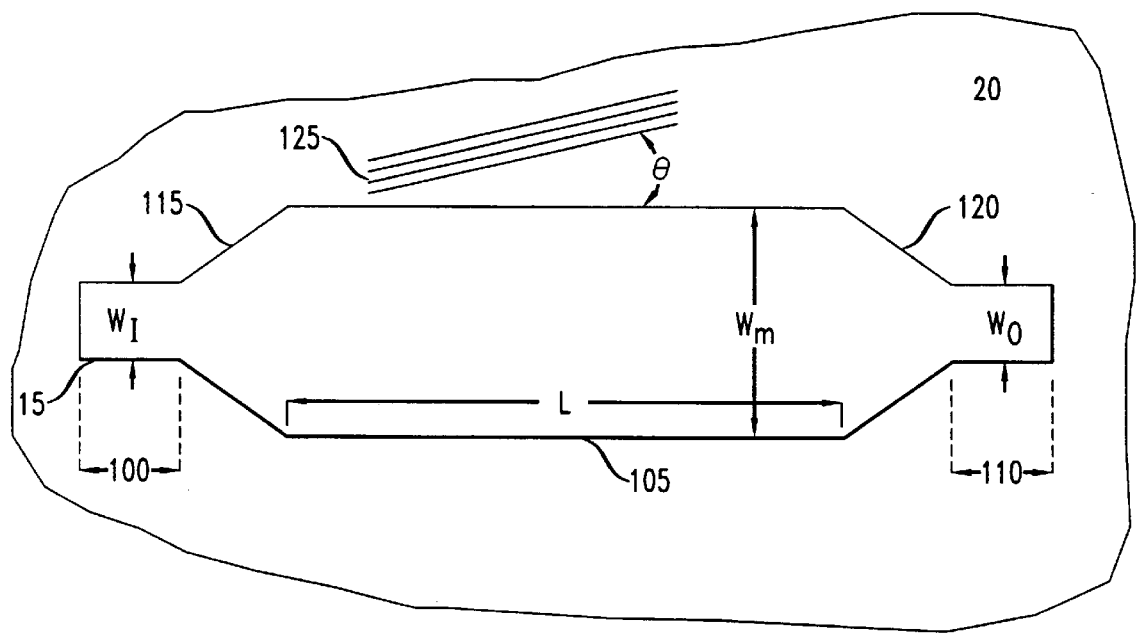
FIG. 2 illustrates a top view of a waveguide structure employed in the modulator of FIG. 1.

A top view of the planar waveguide structure 15 in the silica optical structure 10 is shown in FIG. 2. The source 5 and optional damper 30 of FIG. 1 have not been shown in FIG. 2 for ease of illustration. Referring to FIG. 2, the planar waveguide structure 15 includes an input section 100, a multimode section 105, and an output section 110. The input and output sections 100 and 110 are single mode sections capable of propagating an optical signal in a common even transmission mode. The multimode section 105 can propagate an optical signal in this even transmission mode as well as in a next higher, odd transmission mode.

Phase fronts of a surface acoustic wave generated by the SAW source 5 of FIG. 1 are represented by reference number 125 and are at a particular phase matching angle θ relative to the multimode section 105 in order to provide a particular condition of a periodic refractive index change in the multimode section 105. Such phase matching achieves the desired coupling of power of optical signals between the even and odd transmission modes. Moreover, the multimode section 105 has an interaction length L over which a surface acoustic wave provides such condition.

The number of transmission modes a waveguide section can propagate is determinable from the waveguide's normalized frequency parameter which is commonly referred to as the V-number of the section. The V-number is based on the signal wavelength to be propagated, cross-sectional area of the waveguide section and the relative refractive index difference between the waveguide section and the surrounding silica glass. A common expression for determining the V-number follows and is described in greater detail in D. Marcuse, *Light Transmission Optics*, ch. 8, p. 327 (Van Nostrand Reinhold Co., N.Y., 1992), which is incorporated by reference herein.

$$V = \frac{2\pi}{\lambda} a \sqrt{n_1^2 - n_2^2},$$

where $\lambda$ is the wavelength of an optical signal, the value $\alpha$ is the width of the particular waveguide section and the values $n_1$ and $n_2$ are the refractive indexes of the previously described core and cladding layers, respectively. Exemplary refractive index values for the silica core and cladding layers $n_1$ and $n_2$ are 1.48 and 1.46, respectively.

Accordingly, a particular cross-sectional area of the multimode waveguide section 105 and/or the relative refractive index difference between the waveguide section 105 and the surrounding silica glass 20 is employed such that the section 105 can propagate optical signals in a first, even transmission mode as well as a second, next higher odd transmission mode. Further, the particular cross-sectional area of the waveguide 15 and the relative refractive index difference between the waveguide 15 and/or the surrounding silica glass 20 is employed for the input and output waveguide sections 100 and 110 such that they are capable of propagating an optical signal over a broad bandwidth in an even transmission mode. However, the particular cross-sectional areas and/or the relative refractive index differences are chosen for the output waveguide section 110 to enable power of an optical signal propagating substantially in the even transmission mode to enter the output waveguide section 110 and power of the optical signal propagating substantially in the odd transmission mode to not enter the section 110. Such optical signal power propagating in the odd transmission mode of the multimode section 105 is dissipated as radiation.

For instance, exemplary single mode waveguide structures for the waveguide sections 100 and 110 having widths $W_I$ and $W_O$ of approximately 5 $\mu$m and a height in the range of 4 $\mu$m to 8 $\mu$m as well as a common refractive index $n_1$ that is in excess of 0.64% of the refractive index $n_2$ of the surrounding silica glass 20 can propagate optical signals having wavelengths in the range of, for example, 1.25 $\mu$m to 1.6 $\mu$m in even (symmetrical) or odd (asymmetrical) transmission modes. Moreover, an exemplary multimode structure for the waveguide section 105 having a width in the range of 17.0 $\mu$m and a height in the range in the range of 4 $\mu$m to 8 $\mu$m as well as a common refractive index $n_1$ in excess of 0.64% of the surrounding silica glass 20 can likewise propagate optical signals having wavelengths in the range of, for example, 1.25 $\mu$m to 1.6 $\mu$m.

A waveguide structure of a substantially constant height across its sections as depicted in FIG. 1 can be formed at relatively low cost employing the previously described fabrication techniques. Also, fabricating the waveguide sections with a substantially constant relative index of refraction can likewise be performed at relatively low cost employing conventional techniques. As a consequence, a variation in waveguide width can produce the corresponding single mode and multimode waveguide sections as shown in FIGS. 1 and 2.

Substantially adiabatically tapered sections 115 and 120 of the waveguide structure 15 in FIG. 2 provide transitions between the input waveguide section 100, multimode section 105 and output waveguide section 110 to enable an optical signal launched in the even transmission mode in the input section 100 to substantially continue propagating in that mode through the multimode section 105 and into the output section 110. Such adiabatic transitions can be of a conventional design. For instance, it is advantageous for the length of a conventional adiabatic transition in the direction of the waveguide structure 15 to be approximately between 10 and 100 times the length of one wavelength conveyed in a propagated optical signal. It should be readily understood that although the depicted waveguide 5 has a rectangular cross-sectional area, various other waveguide cross-sectional areas such as, for example, oval or circular, can be employed in accordance with the invention.

In operation, when no surface acoustic wave is generated, an optical signal launched in the input waveguide section 100 continues to propagate in the even transmission mode through the tapered section 115 and multimode section 105 into the tapered section 120 and output waveguide section 110. Little or no power of such optical signal propagates in the second transmission mode of the multimode section 105.

However, when a surface acoustic wave generated by the SAW source 5 of FIG. 1 interacts with the multimode section 105 at the particular relative phase matching angle θ, a periodic change occurs in the effective refractive index over the interaction length L of the multimode section 105. Such periodic refractive index change causes coupling of the respective even and odd transmission modes within the multimode section 105. As a consequence, power of an optical signal propagating into the multimode section 105 in the even transmission mode from the input section 100 is transferred to the odd transmission mode. Such power transfer attenuates the optical signal propagating in the even transmission mode of the multimode section 105.

Since the odd transmission mode is not supported by the output section 110, the signal propagating from the multimode section 105 to the single mode output section 1 10 is substantially in the even transmission mode, which is the attenuated optical signal. The extent of power transfer, and correspondingly the extent of attenuation of the optical signal propagating from the multimode section 105 in the even transmission mode, is based on the magnitude of the power of the generated surface acoustic wave and length L of the multimode section 105. The corresponding optical signal power propagating in the odd transmission mode of the multimode section 105 is dissipated as radiation. Accordingly, it is possible to modulate an optical signal with a second signal by varying the surface acoustic wave power interacting with the multimode section 105 based on the varying magnitude of the second signal. In this manner, the optical signal is attenuated in accordance with the second signal to achieve the desired modulated signal.

Since approximately 90% of the energy of a surface acoustic wave remains within a distance of one acoustic wave wavelength, it is advantageously possible to provide sufficient acoustic wave energy to optical waveguides within silica optical circuits typically positioned within 14 μm to 28 μm of the structure surface 11 of FIG. 1 with acoustical frequencies in the range of 45 MHz to 90 MHz without requiring long interaction lengths for the multimode section 105 or high power requirements for the SAW source 5.

Coupling of power between even and odd transmission modes of the multimode section 105 is produced when the relative angle θ of the generated surface acoustic waves to the multimode section 105 is such that a phase matching condition occurs between transmission modes. For example, it is possible to determine the required angle θ according to the following expression:

$$\sin\theta = \frac{\beta_e - \beta_o}{K},$$

$$K = \frac{2\pi f_a}{v_a}$$

wherein values $\beta_e$ and $\beta_o$ are the propagation constants of the even and odd modes for the multimode waveguide section 105, respectively, and wherein the value $\Sigma_a$ is surface acoustic wave velocity, e.g., approximately 3400 m/sec in silica glass, and the value $f_a$ is the surface acoustic wave frequency. Accordingly, the angle θ of the surface acoustic waves relative to the multimode section 105 is further based on the selected frequency for the surface acoustic waves.

Moreover, the extent of the optical signal power that is transferred between the coupled even and odd transmission modes is based on the periodic change in the refractive index caused by the surface acoustic wave as well as the length of the multimode section 105 over which such periodic refractive index change occurs. A change in refractive index of the multimode section 105 of approximately $2\times10^{-5}$ to $6\times10^{-5}$ is achievable according to the invention using a SAW source 5 providing acoustic energy having a frequency in the range of 25 MHz to 1 GHz on the order of 1 W per centimeter of multimode section 105. Further, it is typically possible to couple as much as approximately 90% and 100% of the power of an optical signal to the second transmission mode using a SAW source 5 producing an surface acoustic wave energy in the approximate range of 0.4 W to 2.0 W over a multimode section length L of approximately 2 to 6 cm at an acoustical frequency of 200 MHz.

Figure 3:
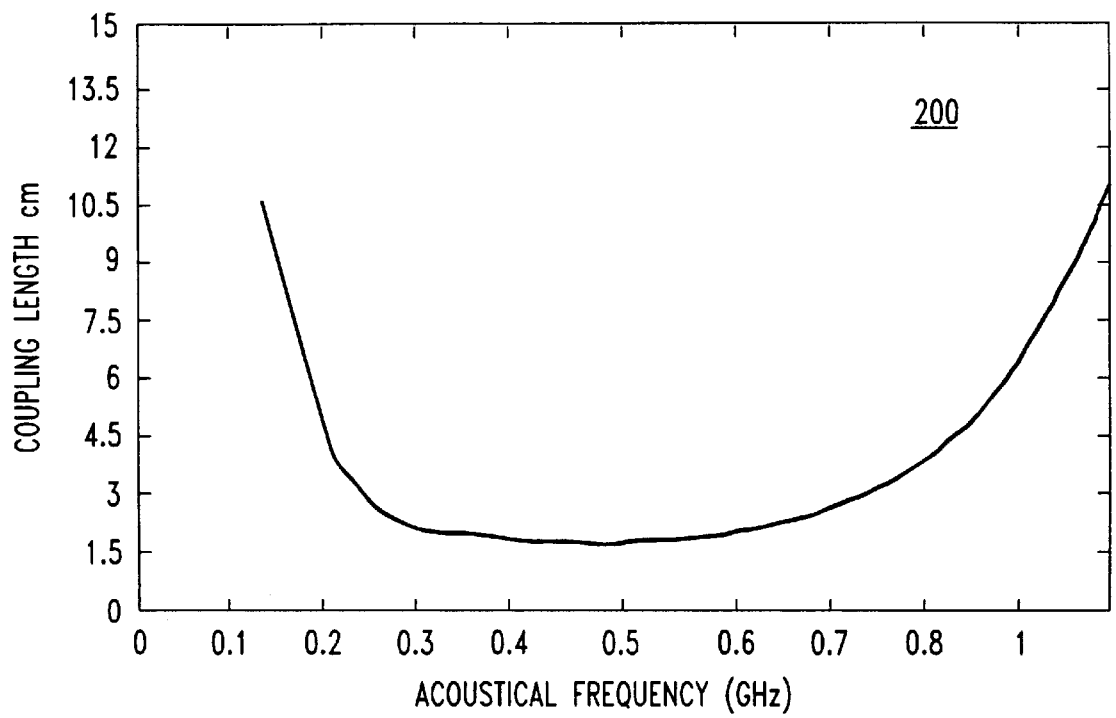
FIG. 3 illustrates a graph representing a relationship between particular surface acoustic wave frequencies and required acousto-optic interaction lengths of a multimode section of the waveguide structure of FIGS. 1 and 2 to achieve a particular modulation of an optical signal.

FIG. 3 shows a graph 200 representing the relationship of surface acoustic wave frequency to the interaction length L of the multimode section 105 of FIG. 2 for achieving a complete transfer of light signal power from the even transmission mode to the next higher, odd transmission mode. The modulator characterized by the graph 200 employs a multimode waveguide section 105 having an approximate width and height of 5 μm and 2 μm, respectively, and a refractive index of about 1.5 relative to a refractive index of approximately 1.46 for the surrounding silica glass cladding 20, shown in FIG. 1. Further, the modulator waveguide structure characterized by the graph 200 employs a SAW source 5 providing an acoustical power of approximately 1.0 W per centimeter over the length L of the multimode waveguide section 105. The graph 200 illustrates that it is possible to employ an interaction length L on the order of 2.0 cm to 5.0 cm to achieve a fill exchange of light signal power between transmission modes with a surface acoustic wave frequency in the range of approximately 100 to 900 MHz.

Referring back to FIG. 1, the optional damper 30 absorbs and/or dampens acoustic wave energy to provide an impediment to reflection of such acoustic energy back at the waveguide structure 15. It is possible that such acoustic wave reflections would propagate through the multimode section 105 at angles other than the desired phase matching angle e causing a degradation in the coupling performance. Such reflections can occur at the edges and other surfaces of the silica optical structure 10, or other components formed within the silica glass 20. The particular configuration used for the damper 30 is not critical to practicing the invention. Accordingly, the damper 30 including the trench 35 containing the acoustic energy absorbing material 40 is for illustration purposes only. An exemplary acoustic energy absorbing material is, for example, conventional epoxy.

Moreover, it is advantageous to position such a damper 30 such that the waveguide structure 15 is located between the SAW source 5 and the damper 30 to allow generated surface acoustic waves to propagate into and thorough the waveguide structure 15. Also, it is possible for a damper according to the invention to be an acoustic energy absorbing material, such as epoxy, formed on edge surfaces of the silica optical structure 10 as well as on the surface 11 to prevent acoustic wave reflections at such surfaces. Other exemplary damper configurations useable according to the invention include other adhesives such as silicone. It is also possible to provide an acousto-optic modulator according to the invention without the damper 30 of FIG. 1.

The exemplary optical component configuration of FIGS. 1 and 2 employs the coupling of transmission modes in a multimode planar waveguide connected between input and output waveguide sections for advantageously modulating an optical signal according to the invention. However such modulator arrangement is depicted for illustration purposes only and not meant to a limitation of the invention. It is also possible to use the acousto-optic coupling of multimode waveguide transmission modes in accordance with other embodiments of the invention including, for example, waveguide structures having single mode waveguides positioned relative to such multimode waveguides to achieve evanescent field couplings between the waveguides for modulating optical signals propagating in the single mode waveguide.

Power of an optical signal launched in a planar or optical fiber waveguide, whether single mode or multimode, propagates in the waveguide core as well as in evanescent field regions within the silica glass surrounding the waveguide core. An evanescent field coupling is achieved between particular transmission modes of two waveguides by positioning the waveguides at a particular separation distance from one another such that their evanescent field regions overlaps the core of the other waveguide. Evanescent field coupling enables power of an optical signal propagating in the first waveguide to be substantially transferred to a second waveguide if the coupling distance between the waveguides is maintained for a particular field interaction length.

Likewise, if such a field interaction length was substantially doubled, then the power of the optical signal would be transferred back to the first waveguide. The required evanescent field interaction length is dependent on the extent of the overlap of the evanescent fields of the waveguide transmission modes and is described in greater detail below with regard to FIG. 4. Evanescent field coupling is described further in, for example, D. Marcuse, *Light Transmission Optics,* ch. 10, p. 420 (Van Nostrand Reinhold Co., N.Y., 1992), which is incorporated by reference herein.

Figure 4:
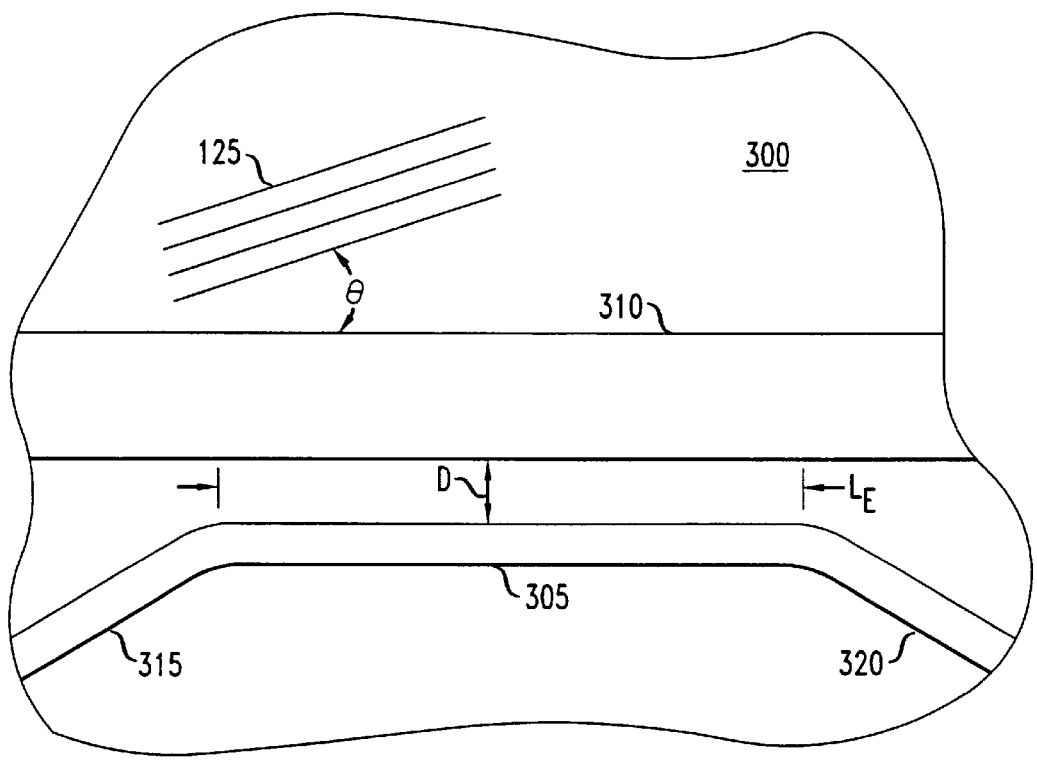
FIG. 4 illustrates a top view of a modulator waveguide structure in accordance with another embodiment of the invention.

FIG. 4 depicts a top view of an exemplary modulator configuration 300 having a single mode planar waveguide 305 having its transmission mode coupled by evanescent field coupling to an even transmission mode of a multimode waveguide. FIG. 4 shows a top view of the waveguide structure 300. The planar single mode waveguide 305 is formed at a distance D from the multimode planar waveguide 310 along a field interaction length $L_E$ of the respective waveguides 305 and 310. The multimode waveguide 310 has a cross-sectional shape for propagating an optical signal in a first, even transmission mode as well as a second, next higher order, odd transmission mode. As in FIG. 2, surface acoustic wave generated by a SAW source, such as the SAW source 5 of FIG. 1, are directed at and interact with the multimode waveguide 305 at a particular relative phase matching angle θ. Phase fronts of the surface acoustic wave are represented by reference number 125 as in FIG. 2. The SAW source producing the acoustic wave phase fronts 125 has not been shown in FIG. 4 for ease of illustration.

The waveguides 305 and 310 are at a separation distance D from one another over the interaction length $L_E$ to achieve an overlap of evanescent fields of optical signals propagating in the transmission mode of the single mode waveguide 305 and the even transmission mode of the multimode waveguide 310. The field interaction length $L_E$ and separation distance D are selected such that power of an optical signal propagating in the single mode waveguide 305 is substantially transferred to the even transmission mode of the multimode waveguide 310 and back again to the transmission mode of the waveguide 305. It is possible to determine an exemplary field interaction length $L_E$ according to the following expressions:

$$L_E = 2 \times \left( \frac{\pi}{2\kappa} \right),$$

provided that $$\Lambda = \frac{2\pi}{|\beta_1 - \beta_2|} >> L_E,$$

wherein the value κ is the coupling coefficient between the coupled transmission modes of the waveguides 305 and 310, and wherein the values $\beta_1$ and $\beta_2$ are propagation constants for the waveguides 305 and 310. It is possible to determine the coupling coefficient κ in a conventional manner based on the separation distance D as described in D. Marcuse, *Light Transmission Optics,* ch. 10, p. 420 (Van Nostrand Reinhold Co., N.Y., 1992).

It is advantageous for the field interaction length $L_E$ to be at least an order of magnitude larger than the value Λ to achieve the desired evanescent field coupling. A generally desirable separation distance D is typically no greater than approximately one wavelength of light of an optical signal propagating in the waveguide 310 for employing an advantageously short field interaction length LE on the order of millimeters to several centimeters for modulating an optical signal having a wavelength in the range of 1.25 μm to 1.6 μm. Greater separation distances D are useable with corresponding longer field interaction lengths $L_E$ according to the invention.

In operation, power of an optical signal launched in an input 315 of the single mode waveguide 305 is transferred by the evanescent field coupling to the even transmission mode of the multimode waveguide 305 and back to the single mode waveguide 305 over the field interaction length $L_E$ to propagate through output section 320 of the waveguide 305. However, when surface acoustic wave 125 is generated, it interacts with the multimode waveguide 310 causing a particular periodic refractive index change in the multimode waveguide 305 as is previously described with respect to FIG. 2. This periodic refractive index change causes power of the transferred optical signal propagating in the even transmission mode of the multimode waveguide 310 to further transfer to the next higher order, odd transmission mode of that waveguide. As a consequence, the optical signal power propagating in the even transmission mode of the waveguide 310 is attenuated, accordingly.

Such attenuation occurs prior to the transference of optical signal power back to the single mode waveguide 305 over the interaction length $L_E$. Thus, the optical signal propagating through the output section 320 of the single mode waveguide 305 is correspondingly attenuated. Also, the optical signal power transferred to the odd transmission mode of the waveguide 310 due to the acousto-optic coupling is dissipated as radiation in a substantially similar manner to that previously described with regard to the multimode section 105 of FIG. 2.

The extent of the coupling of the even and odd transmission modes of the waveguide 310 is based on the power of the surface acoustic wave interacting with the waveguide 310. Accordingly, it is possible to modulate an optical signal propagating in the waveguide 305 with a second signal by varying the power of the surface acoustic wave interacting with the waveguide 310 in accordance with the amplitude variation of this second signal.

Figure 5:
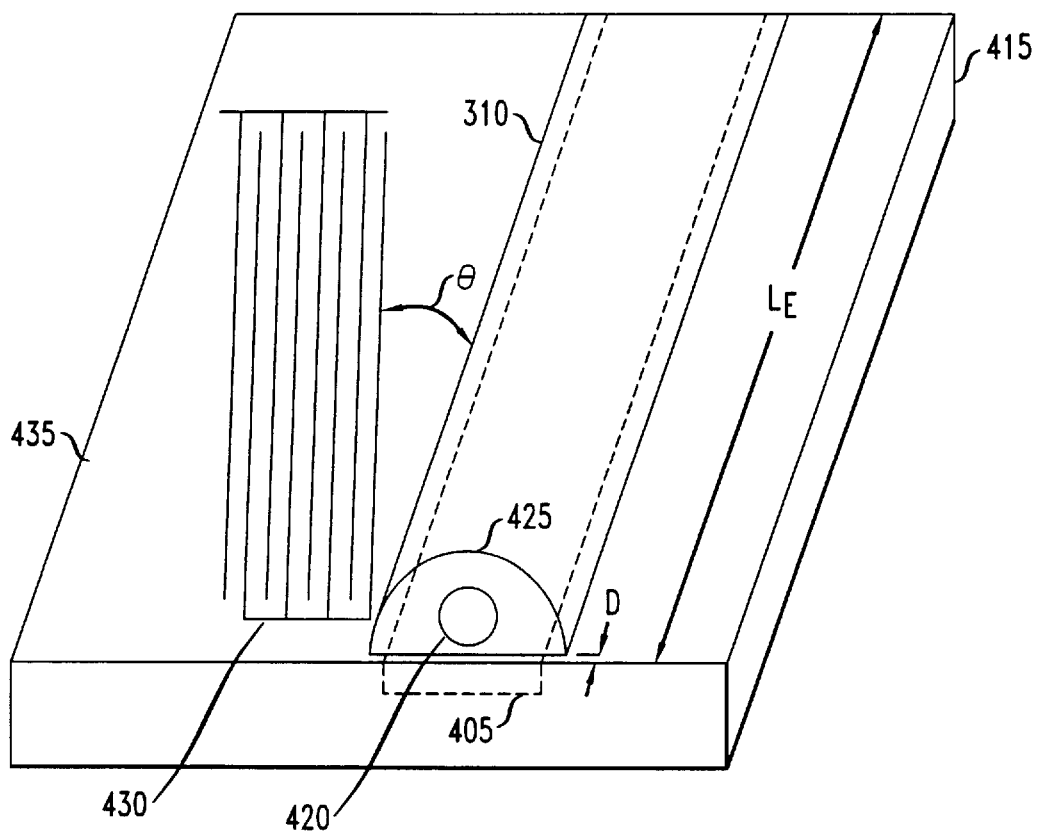
FIG. 5 illustrates a perspective view of yet another embodiment of the invention similar to that illustrated in FIG. 4, but employing an optical fiber waveguide for an evanescent field coupled single mode waveguide.

FIG. 5 shows an exemplary modulator configuration 400 according to the invention that is similar to the configuration 300 of FIG. 4 but that employs a single mode optical fiber waveguide 405 instead of the single mode planar waveguide of the configuration 300. The multimode planar waveguides 310 in the configurations 300 and 400 perform substantially identical functions and are like numbered for clarity of explanation. However, in FIG. 5, the multimode planar waveguide 310 is shown as dashed lines formed within silica glass structure 415.

The optical fiber 405 has a core 420 positioned over the multimode planar waveguide 310. Cladding 425 surrounding the optical fiber core 420 is removed in a region proximate the multimode planar waveguide 310 enabling the desired evanescent field coupling along field interaction length LE of the waveguides 405 and 310. The depicted field interaction length $L_E$ extending for the entire length of the silica glass structure is for illustration purposes only and is not meant to be a limitation of the invention. It is alternatively possible to use a field interaction length $L_E$ that extends less than the entire length of the silica glass structure.

A gap is provided between the optical fiber waveguide 310 and the multimode waveguide 405 to protect surface acoustic wave power from being dissipated by physical contact between the optical fiber 310 and the silica glass structure 415. It is desirable to use a separation distance D between the optical fiber 310 and the silica glass structure 415 in forming the gap of ) 0.5 μm or less, and preferably 0.1 μm or less to maintain an advantageously short interaction length. It is possible for such a gap to be, for example, an air gap or filled with a low density material enabling the exchange power between the waveguides 405 and 310.

Also, a SAW source 430 is positioned on a top surface 435 of the silica glass structure 415 for generating a surface acoustic wave at the needed relative phase matching angle θ to the planar waveguide 310. Thus, it is possible to attenuate or modulate an optical signal launched in the optical fiber waveguide 405 by varying the power of the surface acoustic wave generated by the source 430 in a substantially identical manner to that previously described with respect to FIG. 4.

The modulator configurations 300 and 400 of FIGS. 4 and 5 have been described as having field interaction lengths $L_E$ and waveguide separation distances D that enabled a substantially complete transfer of power back to the single mode waveguides 305 and 405 from the planar multimode waveguide 310 due to the evanescent coupling. Such field interaction lengths $L_E$ and waveguide separation distances D are for illustration purposes only and not meant to be a limitation of the invention. It is alternatively possible to employ interaction lengths $L_E$ and waveguide separation distances D that enable only a partial transfer of power back to the single mode waveguides 305 and 405 from the planar multimode waveguide 310 due to the evanescent coupling. As a consequence, the resulting optical signals propagating in the single mode waveguides 305 and 405 would be scaled, accordingly, relative to the original launched optical signals.

Although several embodiments of the invention have been described in detail above, many modifications can be made without departing from the teaching thereof. All of such modifications are intended to be encompassed within the following claims. For example, although the modulators configurations in FIGS. 1, 2, 4 and 5 are formed within a single silica optical circuit structures, it is also desirable to form such modulators within an integrated optical circuit containing other devices to produce a desired integrated optical signal processing structure having compact dimensions.

The invention claimed is:

1. An acousto-optic modulator comprising:
  a planar waveguide structure formed within silica glass, said waveguide structure having an input section connected to a multimode waveguide section connected to an output section, said input and output sections being single mode sections capable of propagating an optical signal in a first transmission mode, said multimode section capable of propagating an optical signal in said first transmission mode as well as a second transmission mode; and
  a controllable surface acoustic wave (SAW) source positioned relative to said waveguide structure to selectively direct a surface acoustic wave at a particular phase matching angle relative to said multimode section for coupling signal power between said first and second transmission modes for an optical signal propagating from said input section through said multimode section, wherein said coupling causes an attenuation of said optical signal propagating into said output section in said first transmission mode.

2. The modulator of claim 1 wherein said first and second transmission modes are even and next higher, odd transmission modes, respectively.

3. The modulator of claim 1 wherein said multimode waveguide section has a refractive index greater than a refractive index of said input and output waveguide sections.

4. The modulator of claim 1 wherein said multimode waveguide section has a particular cross-sectional are a greater than a cross-sectional area of said input and output waveguide sections.

5. The modulator of claim 4 wherein said waveguide structure is adiabatically tapered between said input and multimode sections and between said multimode and input sections.

6. The modulator of claim 1 wherein said SAW source is located on a surface of a silica optical circuit containing said waveguide structure, said SAW source further producing said surface acoustic wave having a frequency corresponding to a phase matching condition between said first and second transmission modes of said multimode section.

7. The modulator of claim 1 wherein said SAW source varies power of said surface acoustic wave in accordance with a second signal for modulating an optical signal propagating in said waveguide structure in accordance with said second signal.

8. The modulator of claim 1 wherein said acoustic frequency is in the range of approximately 25 MHz to 1.0 GHz.

9. The modulator of claim 1 wherein said SAW source is an interdigital transducer formed on a surface of a silica optical circuit containing said waveguide structure.

10. The modulator of claim 1 wherein said multimode waveguide section has a length between approximately 0.5 and 5 cm.

11. The modulator of claim 1 further comprising an acoustic energy damper formed on a silica optical circuit containing said waveguide structure, said damper for reducing acoustic wave energy that propagates through said waveguide structure at angles other than said phase matching angle.

12. The modulator of claim 11 wherein said damper comprises an acoustic energy absorbing material disposed in a trench within said silica optical circuit.

13. The modulator of claim 12 wherein said trench containing epoxy extends to a depth within said silica optical circuit that includes said waveguide structure.

14. The modulator of claim 12 wherein said energy absorbing material is epoxy.

15. The modulator of claim 12 wherein said waveguide structure is located between said damper and said SAW source.

16. The modulator of claim 11 wherein damper includes acoustic energy absorbing material disposed on at least one surface of said integrated optical circuit.

17. The modulator of claim 16 wherein said energy absorbing material is disposed on at least one edge surface of said integrated optical circuit.

18. The modulator of claim 16 wherein said energy absorbing material is epoxy.

19. An acousto-optic modulator comprising:
  a single mode waveguide;
  a planar multimode waveguide structure formed within a silica glass structure, said multimode waveguide positioned relative to said single mode waveguide such that an optical signal propagating in said single mode waveguide is substantially evanescent field coupled to a first transmission mode of said multimode waveguide structure, said multimode section capable of propagating an optical signal in said first transmission mode as well as a second transmission mode; and
  a controllable surface acoustic wave (SAW) source positioned relative to said multimode waveguide to selectively direct a surface acoustic wave at a particular phase matching angle relative to said multimode waveguide for coupling signal power between said first and second transmission modes, wherein said coupling causes an attenuation of said optical signal propagating in said single mode waveguide.

20. The modulator of claim 19 wherein said single mode waveguide is a planar waveguide formed within said silica glass structure.

21. The modulator of claim 19 wherein said single mode waveguide is an optical fiber disposed proximate said silica glass containing said planar multimode waveguide.

22. The modulator of claim 19 wherein the single mode waveguide is capable of propagating an optical signal having at least one wavelength, and wherein a separation distance between said multimode waveguide and a portion of said single mode waveguide is no more than approximately said wavelength.

23. The modulator of claim 19 wherein said first and second transmission modes are even and next higher, odd transmission modes, respectively.

24. The modulator of claim 19 wherein said SAW source is located on a surface of a silica optical circuit containing said waveguide structure, said SAW source further producing said surface acoustic wave having a frequency corresponding to a phase matching condition between said first and second transmission modes of said multimode section.

25. The modulator of claim 19 wherein said SAW source varies power of said surface acoustic wave in accordance with a second signal for modulating an optical signal propagating in said waveguide structure in accordance with said second signal.

26. The modulator of claim 19 wherein said acoustic frequency is in the range of approximately 25 MHz to 1.0 GHz.

27. The modulator of claim 19 wherein said SAW source is an interdigital transducer formed on a surface of a silica optical circuit containing said waveguide structure.

28. The modulator of claim 19 wherein said multimode waveguide structure has a length between approximately 0.5 and 5 cm.

29. The modulator of claim 19 further comprising an acoustic energy damper formed on a silica optical circuit containing said waveguide structure, said damper for reducing acoustic wave energy that propagates through said waveguide structure at angles other than said phase matching angle.

30. The modulator of claim 29 wherein said damper comprises an acoustic energy absorbing material disposed in a trench within said silica optical circuit.

31. The modulator of claim 30 wherein said trench containing epoxy extends to a depth within said silica optical circuit that includes said multimode waveguide.

32. The modulator of claim 30 wherein said energy absorbing material is epoxy.

33. The modulator of claim 30 wherein said multimode waveguide is located between said damper and said SAW source.

34. The modulator of claim 29 wherein damper includes acoustic energy absorbing material disposed on at least one surface of said integrated optical circuit.

35. The modulator of claim 34 wherein said energy absorbing material is disposed on at least one edge surface of said integrated optical circuit.

36. The modulator of claim 34 wherein said energy absorbing material is epoxy.

37. An acousto-optic modulator comprising:

input and output single mode waveguide sections;

a planar multimode waveguide section having a structure capable of propagating an optical signal in first and second transmission modes, said planar multimode waveguide section positioned relative to said input and output waveguide sections to enable optical signal power launched in said input section to transfer to said first transmission mode of said multimode section and then to transfer again to said output section; and a controllable surface acoustic wave (SAW) source positioned relative to said waveguide structure to controllably direct a surface acoustic wave at a particular phase matching angle relative to said multimode section for coupling signal power between said first and second transmission modes for an optical signal propagating in said multimode section from said input section, wherein said coupling causes an attenuation of said propagating optical signal in said first transmission mode that transfers to said output section.

38. The modulator of claim 37 wherein said coupling between said input and multimode sections, and said multimode and output sections are adiabatic transition sections and wherein said input and output sections have structures capable of propagating an optical signal in said first transmission mode.

39. The modulator of claim 37 wherein said coupling between said input and multimode sections, and said multimode and output sections are evanescent field couplings and wherein said input section is directly connected to said output section.

* * * * *